3,027,395
OXIDATION PROCESS

Dexter B. Sharp, Vandalia, and Gail H. Birum, Dayton, Ohio, assignors to Monsanto Chemical Company, St. Louis, Mo., a corporation of Delaware
No Drawing. Filed Aug. 26, 1959, Ser. No. 836,050
1 Claim. (Cl. 260—461)

This invention relates to a method for oxidizing phosphorus esters to produce useful compounds therefrom. More particularly, this invention relates to a method of oxidizing trivalent phosphorus esters so as to obtain useful pentavalent phosphorus compounds and other useful products.

It is well known that trivalent phosphorus esters may be oxidized to pentavalent phosphorus esters by a number of oxidizing agents. However, in many cases the pentavalent phosphorus compounds obtained are not suitable for certain purposes. For example, when well known inorganic oxidizing agents, such as $KMnO_4$, $CrO_3$, etc. are used, they do effect the oxidation but their use creates problems of purification such as removal of by-product impurities which contaminate the pentavalent product obtained. In many cases, water that is present as a solvent for the oxidizing agent or that is formed as a by-product of the reaction results in undesired hydrolysis of at least part of the product. Also, some of these oxidizing agents, such as 100% anhydrous hydrogen peroxide, introduce the hazards of explosion, and are so vigorous in their action that extraordinary precautions must be taken in their use.

It is an object of this invention to provide a method of overcoming the above defined problems.

It is a further object of this invention to provide an oxidation process by which oxidized phosphorus products are obtained without formation of deleterious by-products.

It is yet another object of this invention to provide an oxidation process by which are obtained easily separatable, non-deleterious, valuable by-products.

It is also an object of this invention to provide an oxidation process by which oxidized phosphorus products are obtained in a safer and more controllable manner than given by some other processes.

These and other objects will become apparent from the description given below.

We have found that the problems indicated above can be avoided and the objects stated above can be accomplished by effecting the oxidation of esters of trivalent phosphorus acids to esters in which phosphorus is in the pentavalent state by means of an organic hydroperoxide compound. By oxidizing the lower valent phosphorus compound with an organic hydroperoxide, the higher valent phosphorus compound is prepared in high yield as desired in admixture with an easily removable organic alcohol by-product. By operating in this manner, no hydrolysis of the oxidized phosphorus compound occurs and no salt by-product problem arises.

As herein before pointed out, this invention is directed to the oxidation of trivalent phosphorus esters capable of being oxidized to pentavalent phosphorus compounds. The nature of the product will vary, depending upon the particular compounds being oxidized. Oxidation of trialkyl phosphites, phosphonites, and phosphinites yields the respective trialkyl phosphates, phosphonates, and phosphinates. A particular embodiment of this invention involves the oxidation of complex phosphite-phosphonate, phosphite-phosphinate, phosphite-phosphine oxide derivatives, and other similar compounds to produce the respective phosphate-phosphonates, phosphate-phosphinates, phosphate-phosphine oxide derivatives, and related substances, the hydrolysis of which would considerably impair their utility for such purposes as gasoline additives, flame-proofing agents in polymeric materials, and as plasticizers.

Among the organic hydroperoxides that can be employed in this invention are, e.g., the aliphatic primary, secondary, or tertiary alkyl, alkenyl, alkynyl, cycloalkyl hydroperoxides and the substituted derivatives thereof. Such types of compounds include: methyl, propyl, octyl, decyl, dodecyl, 2-chloropropyl, and 2-ethylhexyl hydroperoxides; isopropyl, sec-amyl, 3-octyl and 2-dodecyl hydroperoxides; tert-butyl, tert-amyl, and tert-octyl hydroperoxides. Examples of alkenyl hydroperoxides are: allyl hydroperoxide, 1-but-2-enyl hydroperoxide, 2-(3-methyl)-3-butenyl hydroperoxide, 2-(2-methyl)-3-butenyl hydroperoxide, propylene trimer (branched) hydroperoxide, propylene tetramer hydroperoxide. Examples of cycloalkyl and cycloalkenyl hydroperoxides useful in this invention are cyclohexyl hydroperoxide, 3-cyclohexenyl hydroperoxide.

Arylaliphatic hydroperoxides may also be used in this invention. Examples of such compounds are the aralkyl hydroperoxides and substituted derivatives thereof. Such groups of compounds include $\alpha,\alpha$-dimethylbenzyl hydroperoxide (cumene hydroperoxide), diphenylmethyl hydroperoxide, triphenylmethyl hydroperoxide, $\alpha$-phenethyl hydroperoxide, benzyl hydroperoxide, etc.

In carrying out the process of this invention, the oxidation of the trivalent phosphorus compounds can take place merely by mixing the reactants at room temperature. However, with particular reference to low molecular weight trivalent phosphorus esters, it is oftentimes preferred to cool the mixture of the hydroperoxide and phosphorus ester to, say, —70° C. to 20° C., depending upon which reactants are combined, to control the resulting exothermic reaction.

The oxidation of phosphorus compounds with hydroperoxides is readily conducted in the absence of an inert solvent, or catalyst. However, solvents and catalysts may be employed. The use of solvents is particularly advantageous when working with the more viscous phosphorus compounds and the more reactive hydroperoxides. Such solvents may be, e.g. benzene, toluene, xylene, dioxane, alkylene halides, such as methylene chloride and methylene bromide, hexane, and mixtures thereof. No particular order of contacting the reactants need be employed. However, we usually add the oxidizing agent portionwise to the phosphorus compound being oxidized to avoid unduly exothermic reactions and waste of reactants. The trivalent phosphorus compound to be oxidized is usually contacted with a stoichiometric quantity or a slight excess of the organic hydroperoxide oxidizing agent while stirring the mixture to insure complete reaction. Any excess organic hydroperoxide can easily be removed along with the alcohol by-product by known physical means, e.g., volatilization, extraction, etc.

As pointed out above, an important corollary and advantage of the oxidation process of this invention is the concomitant production of an alcohol by-product, the nature of which will vary depending upon the hydroperoxide compound used. For example, if a primary hydroperoxide such as methyl hydroperoxide is used, a primary alcohol, methyl alcohol will be produced. If a tertiary hydroperoxide such as triphenylmethyl hydroperoxide is employed in the reaction, a tertiary alcohol, triphenylmethyl alcohol will be prepared. These alcohol by-products are easily removed from the oxidized phosphorus compound product by known means such as vacuum distillation, to obtain the pentavalent phosphorus compound and the alcohol by-product in substantially pure forms.

A few examples of trivalent phosphorus compounds that can be oxidized according to this invention and the products obtained thereby are, e.g., Trimethyl phosphite to obtain trimethyl phosphate,
Triphenyl phosphite to obtain triphenyl phosphate,
Dipropyl propylphosphonite to obtain dipropyl propylphosphonate,
Bis(2-bromobutyl) 2-bromobutylphosphonite to obtain bis(2-bromobutyl) 2-bromobutylphosphonate,
Methyl diethylphosphinite to obtain methyl diethylphosphinate,
{1-[bis(2-chloropropoxy)phosphinyl]ethyl} bis(2-chloropropyl) phosphite to obtain {1-[bis(2-chloropropoxy)-phosphinyl]ethyl bis(2-chloropropyl) phosphate},
1 - [α - (diethoxyphosphinyl)benzyl]-2,5-dioxaphosphorinane to obtain 1-[α-(diethoxyphosphinyl)benzyl]-1-oxa-2,5-dioxaphosphorinane,
Tris[1-(ethoxyethylphosphinyl)propyl] phosphite to obtain tris [1-(ethoxyethylphosphinyl)propyl] phosphate,
[α-(Dipropylphosphinyl)-p-methylbenzyl] dihexyl phosphite to obtain [α-(dipropylphosphinyl)-p-methylbenzyl] dihexyl phosphate, and
Bis[1 - (didodecyloxyphosphinyl) - 2-ethylhexyl] phenylphosphonite to obtain bis[1-(didodecyloxyphosphinyl)-2-ethylhexyl] phenylphosphonate.

This list of examples is not intended to be exhaustive of the types of compounds that can be oxidized according to the process of this invention, but is intended only to disclose to those in the art how the invention is intended to accomplish its purpose.

*Example 1*

A 51.0 g. (0.1 mole) portion of 1-[bis(2-chloropropoxy)-phosphinyl]propyl bis(2-chloropropyl) phosphite was placed in a 500 ml. reaction flask, stirred and cooled as 15.8 g. (0.1 mole) of propylene trimer hydroperoxide was added in 0.2 hour. There was an exothermic reaction to the end of the addition of the hydroperoxide compound. A test of the colorless reaction mixture for peroxide with potassium iodide solution was negative. Distillation gave 11.5 g. of light yellow liquid, B.P. 51–65° C./1.0 mm., $n_D^{25}$ 1.4417, a propylene trimer alcohol, and 53.0 g. of a light yellow liquid residue, $n_D^{25}$ 1.4727, at a maximum pot temperature of 150° C./1.0 mm., which was 1-[bis(2-chloropropoxy)phosphinyl]propyl bis(2 - chloropropyl) phosphate. Nuclear magnetic resonance spectra showed that the trivalent phosphorus of the starting material had been completely oxidized to the pentavalent state.

*Example 2*

A 0.1 molar portion of tert-butyl hydroperoxide was added to 0.1 mole of triethyl phosphite with cooling in an ice bath, and the resulting products were worked up in a manner similar to that of Example 1 to give triethyl phosphate and tert-butyl alcohol.

*Example 3*

A 0.1 molar portion of diethyl phenylphosphonite was oxidized with 0.1 mole of tert-butyl hydroperoxide according to the procedure defined in Example 1 to give diethyl phenylphosphonate and tert-butyl alcohol.

We claim:
The process which comprises contacting 1-[bis(2-chloropropoxy)phosphinyl]propyl bis(2 - chloropropyl) phosphite with propylene trimer hydroperoxide, and recovering from the resulting reaction mixture 1-[bis(2-chloropropoxy)phosphinyl]-propyl bis(2-chloropropyl) phosphate.

References Cited in the file of this patent
UNITED STATES PATENTS 2,726,255    Walker et al.   Dec. 6, 1955
2,851,476    Hechenbeikner et al.   Sept. 9, 1958

OTHER REFERENCES

Wacek et al.: Monatsh., 85, 1–6 (1954).
Pavlyuchenko et al.: Chemical Abs. 49, 14338e (1955).
Kato et al.: Chemical Abstracts, 49, 15722(a) (1955).
Cox, Jr., et al.: J. Am. Chem. Soc., 80, 5441–5443 (1958).